(12) United States Patent
Sinha et al.

(10) Patent No.: US 10,821,713 B2
(45) Date of Patent: Nov. 3, 2020

(54) DEVICE FOR APPLICATION OF COMPOSITE MATERIALS

(71) Applicant: General Electric Company, Schenectady, NY (US)

(72) Inventors: Shatil Sinha, Niskayuna, NY (US); James Duvall Bollacker, Albany, NY (US); Matthew Harper Hockemeyer, Saratoga Springs, NY (US); Nitin Garg, Niskayuna, NY (US); Younkoo Jeong, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 655 days.

(21) Appl. No.: 15/079,200

(22) Filed: Mar. 24, 2016

(65) Prior Publication Data

US 2017/0274636 A1    Sep. 28, 2017

(51) Int. Cl.
| | | |
|---|---|---|
| *B32B 37/00* | (2006.01) | |
| *B32B 37/12* | (2006.01) | |
| *B32B 38/00* | (2006.01) | |
| *B32B 39/00* | (2006.01) | |
| *B29C 70/38* | (2006.01) | |
| *B32B 37/02* | (2006.01) | |

(52) U.S. Cl.
CPC .......... *B32B 37/0053* (2013.01); *B29C 70/38* (2013.01); *B32B 37/02* (2013.01); *B32B 37/1284* (2013.01); *B32B 39/00* (2013.01)

(58) Field of Classification Search
CPC . B32B 37/0053; B32B 37/02; B32B 37/1284; B32B 38/0004; B29C 70/38
See application file for complete search history.

(56) References Cited

U.S. PATENT DOCUMENTS

| | | | |
|---|---|---|---|
| 4,285,752 A * | 8/1981 | Higgins | ................ B29C 70/388 |
| | | | 156/250 |
| 4,491,493 A | 1/1985 | Eaton | |
| 5,192,392 A | 3/1993 | Peterson et al. | |
| 5,693,174 A | 12/1997 | Nakata et al. | |
| 6,113,716 A | 9/2000 | Schramayr et al. | |

(Continued)

FOREIGN PATENT DOCUMENTS

DE    4117347 A1    12/1992

OTHER PUBLICATIONS

Partial European Search Report and Opinion issued in connection with corresponding EP Application No. 17161968.7 dated Jul. 31, 2017.

(Continued)

*Primary Examiner* — Mark A Osele
*Assistant Examiner* — Christopher C Caillouet
(74) *Attorney, Agent, or Firm* — Dority & Manning, P.A.

(57) ABSTRACT

A device for the placement of material on a surface includes a housing, a motor coupled to the housing, and a driving component coupled to the housing and powered by the motor. The device further includes at least one guide chute defining a guide channel with the driving component. The device further includes a layup roller coupled to the housing adjacent the guide channel. The layup roller includes a roller surface and the guide channel is configured to discharge a quantity of material to the roller surface. The layup roller is configured to deposit the material onto the surface.

20 Claims, 7 Drawing Sheets

(56) References Cited

U.S. PATENT DOCUMENTS

| | | |
|---|---|---|
| 7,841,375 B2 | 11/2010 | Rindels |
| 8,038,825 B2 * | 10/2011 | Torres Martinez ... B29C 70/388 |
| | | 156/250 |
| 8,454,788 B2 | 6/2013 | Kisch |
| 8,557,074 B2 | 10/2013 | McCowin |
| 8,721,316 B2 | 5/2014 | Madsen et al. |
| 9,149,949 B2 * | 10/2015 | Johnson ............... B26D 7/0683 |
| 2015/0034247 A1 | 2/2015 | Silcock et al. |
| 2015/0336272 A1 | 11/2015 | Drew |

OTHER PUBLICATIONS

Extended European Search Report and Opinion issued in connection with corresponding EP Application No. 17161968.7 dated Nov. 7, 2017.

Machine Translation and First Office Action and Search issued in connection with corresponding CN pplication No. 201710182770.6 dated Oct. 26, 2018.

\* cited by examiner

DEVICE FOR APPLICATION OF COMPOSITE MATERIALS

BACKGROUND

The field of the disclosure relates generally to a device for applying materials to a surface, and more particularly, to a device for applying composite materials to a surface.

Many known methods are used for automating the fabrication of composite parts such as Automated Fiber Placement (AFP), which uses large spools of either dry fibers or pre-impregnated fibers. The material is placed onto a tool surface, such as an airframe for a helicopter, typically by a manipulator such as a multi-axis robotic arm. Known AFP methods are limited for use with materials that can be packaged in large spools and unwound by the manipulator. However, some known Ceramic Matrix Composite (CMC) materials and Polymer Matrix Composite (PMC) materials are not available in large spools due to current manufacturing limitations. Placing these composite materials onto a tool surface using conventional AFP machines is not feasible because of the unavailability of these composite materials in spools.

BRIEF DESCRIPTION

In one aspect, a device for the placement of material on a surface is provided. The device includes a housing, a motor coupled to the housing, and a driving component coupled to the housing and powered by the motor. The device further includes at least one guide chute defining a guide channel with the driving component. The device further includes a layup roller coupled to the housing adjacent the guide channel. The layup roller includes a roller surface and the guide channel is configured to discharge a quantity of material to the roller surface. The layup roller is configured to deposit the material onto the surface.

In another aspect, a device for the placement of material on a surface is provided. The device includes a housing, an actuator coupled to the housing, a suction arm coupled to the actuator, and a linear guide coupled to the housing and the suction arm. The device further includes a suction head coupled to the suction arm. The actuator is configured to translate the suction arm along a vertical axis defined normal to the tool surface. The linear guide is configured to avoid translation motion of the suction arm along a lateral axis and a longitudinal axis, the lateral axis and the longitudinal axis being defined orthogonal to each other and to the vertical axis. The suction head is configured to couple to the material and remove the material from a first position away from the surface and place the strip at a second position on the surface.

In yet another aspect, a method of adhering a material to a surface using a device is provided. The device includes a motor and a drive belt powered by the motor. The device further includes a passive belt opposing the driving belt, the passive belt and driving belt defining a belt channel. The device further includes at least one guide chute, the guide chute and drive belt defining a guide channel. The device further includes a layup roller adjacent the guide channel. The method includes positioning the material into the guide channel, driving the drive belt such that the material moves from the belt channel to the guide channel to a position adjacent to the layup roller, and translating the device along a plane parallel to the surface such that the material is adhered to the tool surface.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The automated material delivery device described herein facilitates the fabrication of a part for an apparatus separate from the automated material delivery device. The automated material delivery device facilitates the fabrication of the part by laying down thin strips of material on a tool surface. The tool surface includes, for example and without limitation, engine parts, blades, vanes, nozzles, shrouds, and liners. Laying down strips using the device and methods described herein facilitates a greater degree of control and flexibility in making the part. The parts, once manufactured, have a wide array of industrial applications, such as use in the aircraft industry to manufacture structural components. Thin strips are capable of adapting and contouring to complex geometries on a tool surface and reduce the possibility of developing wrinkles in the composite fibers of the strips. Further, thin strips improve material utilization by decreasing the amount of waste of raw composite materials. The device described herein facilitates the automation of laying strips on the tool surface, while also improving the quality of the part and the consistency of the surface of the part.

Figure 1:
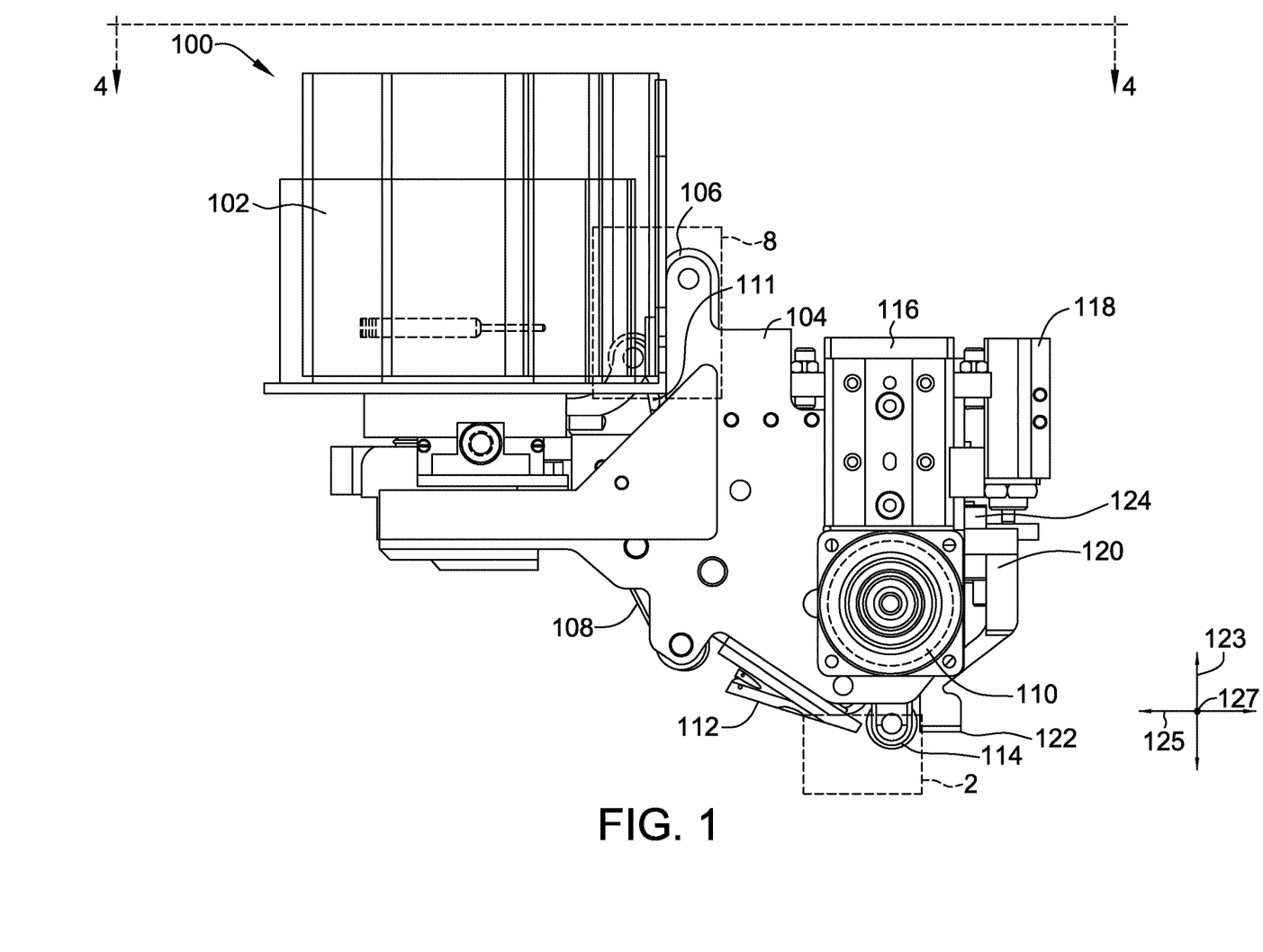
FIG. 1 is a front plan view of an exemplary automated material delivery device.

FIG. 1 is a front plan view of an exemplary automated material delivery device 100. Device 100 includes a cartridge 102 coupled to belt housing 104. A driving component 106 and a passive component 108 are driven by motor 110 at least partially within belt housing 104. In the exemplary embodiment, driving component 106 is a driving belt 106, and opposed component 108 is a passive belt 108. In alternative embodiments, driving component 106 is any suitable component that enables device 100 to function as described herein, and includes, but is not limited to, rollers, belts, and belts with suction holes for improved gripping. In alternative embodiments, passive component 108 is any suitable component that enables device 100 to function as described herein, and includes, but is not limited to, rollers, belts, and belts with suction holes for improved gripping.

In the exemplary embodiment, as explained in more detail below, as driving belt 106 translates, driving belt 106 passes through first guide chute 111, also described herein as a first guide surface, and second guide chute 112, also described herein as a second guide surface. A layup roller 114 is coupled to belt housing 104 and is positioned opposite actuator 116, which selectively translates layup roller 114 toward a tool surface 117 (shown in FIG. 2). In the exemplary embodiment, device 100 further includes a first linear actuator 118 coupled to belt housing 104, and a suction arm 120 coupled to linear actuator 118, which enables a suction head 122 at the distal end of suction arm 120 to selectively engage strips 121 of a ply material located in a separate tray (not shown) via movement along a vertical axis 123. Device 100 further includes a second linear actuator 124, also described herein as linear guide 124, coupled to belt housing 104 and suction arm 120, which enables suction head 122 to selectively engage strips 121 as explained further herein. In alternative embodiments, first guide chute 111 and second guide chute 112 are any suitable surfaces that enable strips 121 to be guided into position while reducing friction between guide surface 111, 112 and strip 121, including, but not limited to, a roller, a belt, and an air bearing.

Figure 2:
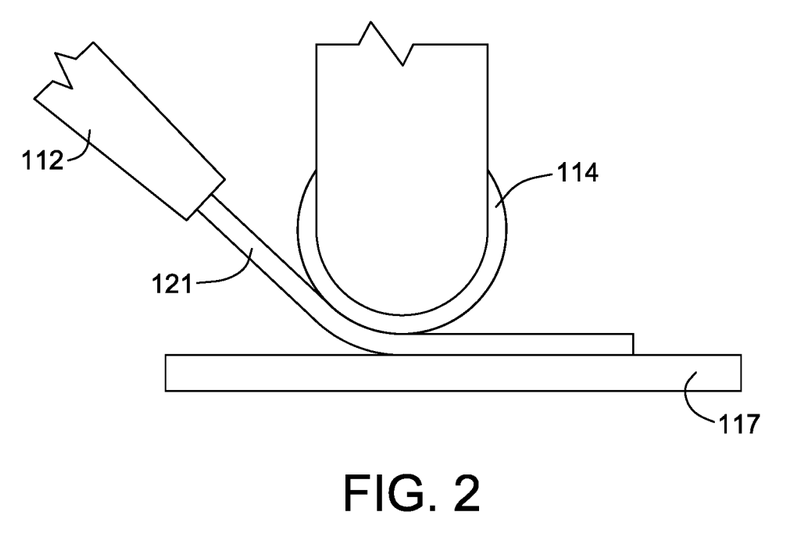
FIG. 2 is an enlarged perspective view of the automated material delivery device shown in FIG. 1 and taken within area 2.

FIG. 2 is an enlarged perspective view of a portion of automated material delivery device 100 (shown in FIG. 1) taken within area 2. In the exemplary embodiment, strip 121, is bent and positioned onto tool surface 117 and compressed to tool surface 117 by layup roller 114. Strip 121, also known as short tape, is a substantially rectangular piece of material. In the exemplary embodiment, strip 121 includes a Ceramic Matrix Composite (CMC) material or a Polymer Matrix Composite (PMC) material. In alternative embodiments, strip 121 is any suitable shape and includes any suitable material that enables device 100 to function as described herein, including, but not limited to, parcels of material that otherwise would not be characterized as strips.

Figure 3:
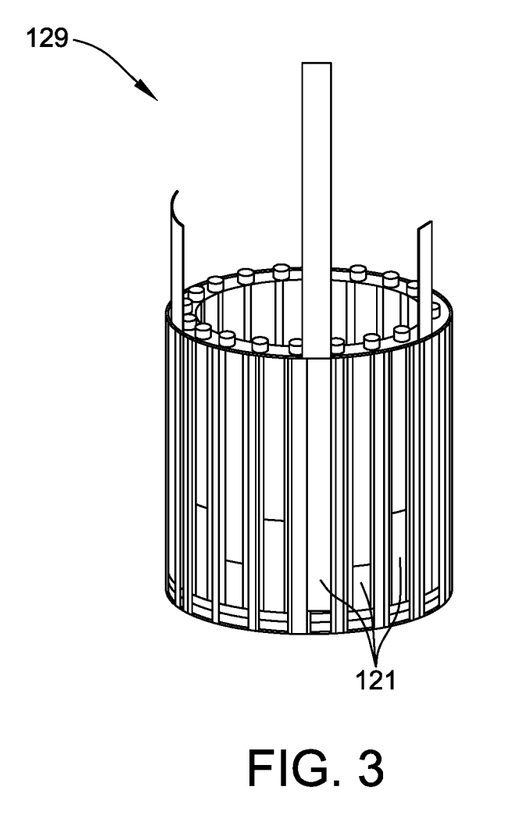
FIG. 3 is a perspective view of an exemplary embodiment of a strip holder for use with the automated material delivery device shown in FIG. 1.

FIG. 3 is a perspective view of an exemplary embodiment of a strip holder 129 for use with automated material delivery device 100 (shown in FIG. 1). More specifically, strip holder 129 is coupled to cartridge 102. Strip holder 129 is configured to hold a plurality of strips 121 coupled to strip holder 129 circumferentially around an outer surface of strip holder 129. Strip holder 129 is configured to rotate inside cartridge 102 and is configured to discharge one strip 121 at a time toward first guide chute 111, similar to the operation described below. In alternative embodiments, strip holder 129 has the shape of a tape roller such that strips 121 are held within the volume of strip holder 129, and not just on the exterior of strip holder 129. In other alternative embodiments, in the absence of strip holder 129, cartridge 102 is configured to discharge at least one strip 121 toward first guide chute 111.

Figure 4:
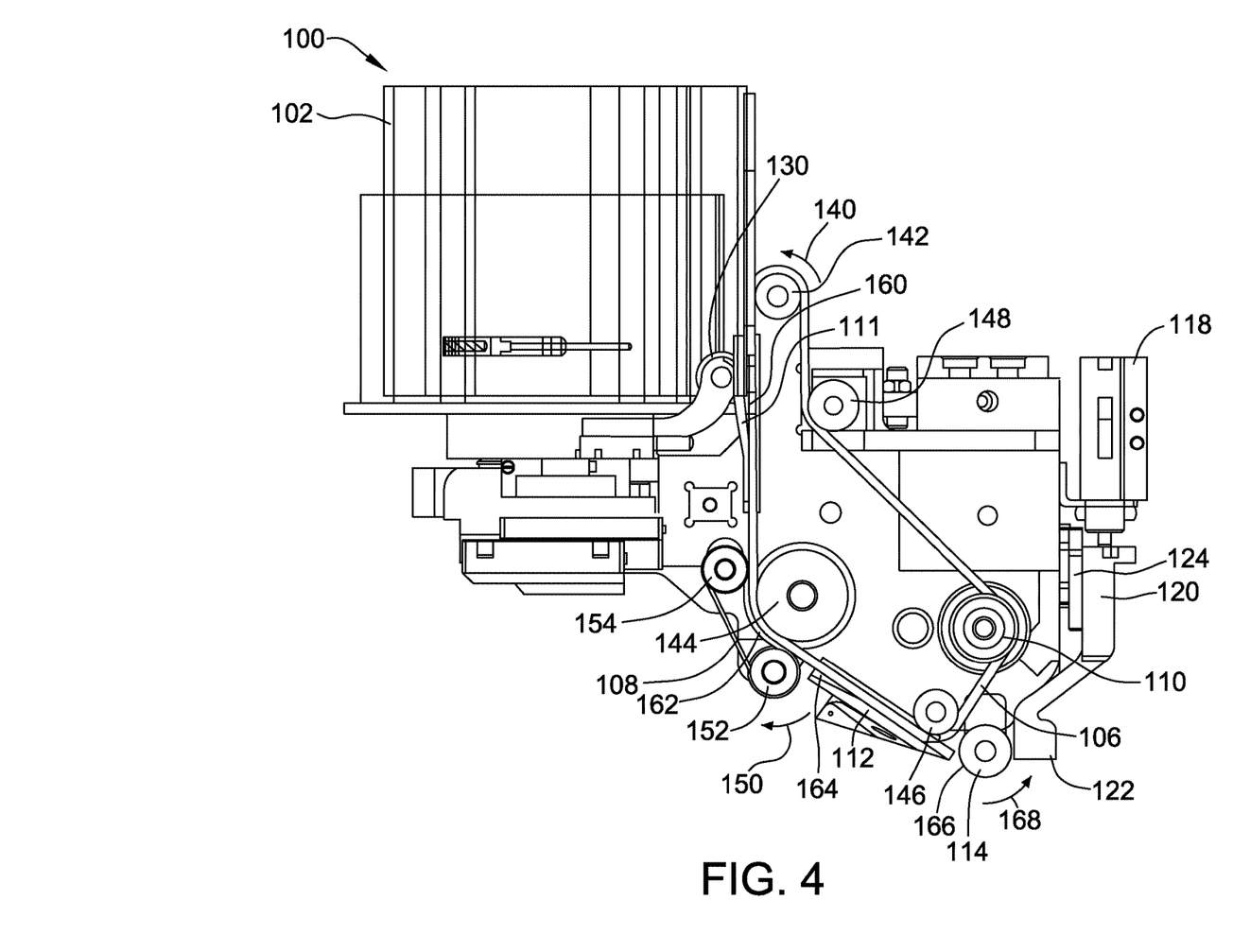
FIG. 4 is a cross-sectional view of the automated material delivery device shown in FIG. 1 taken along line 4-4.

FIG. 4 is a cross-sectional view of automated material delivery device 100 taken along line 4-4. Cartridge 102 either includes strip holder 129 (shown in FIG. 3), or includes a plurality of strips 121 (shown in FIG. 2) inside cartridge 102 independent of a mechanism such as strip holder 129. Regardless, a nip roller 130 engages with one strip 121 at a time, and positions each strip 121 into a channel 160, also referred to herein as a guide channel, defined by driving belt 106 and first guide chute 111. When strip holder 129 (shown in FIG. 3) rotates to position a strip 121 into channel 160, nip roller 130 is disengaged from belt 106 to provide enough space between nip roller 130 and belt 106. Once strip holder 129 positions a strip 121 into channel 160, nip roller 130 engages on driving belt 106 to nip strip 121 between nip roller 130 and belt 106. In the exemplary embodiment, nip roller 130 is translated by a linear actuator (not shown), such as but not limited to a linear electromagnetic motor, pneumatic cylinder, or hydraulic cylinder, to engage and disengage nip roller 130 with belt 106 to control a pushing force, allowing strip 121 to move with belt 106 when belt 106 translates. Driving belt 106, also described as tape delivery belt 106 or a feeding belt 106, is driven by motor 110 and translates in a direction 140 about pulleys 142, 144, and 146. A tensioner 148 induces tension on driving belt 106. Opposed belt 108, also described as corner belt 108, is also driven by motor 110 and rotates in a direction 150 about pulleys 152 and 154. In the exemplary embodiment, motor 110 is an electric motor. In alternative embodiments, motor 110 is any suitable motor that enables device 100 to function as described herein.

Driving belt 106 and first guide chute 111 define channel 160 for strips 121 to move from cartridge 102 along driving belt 106 toward second guide chute 112. Strips 121 move along driving belt 106 from channel 160 into a channel 162 defined between driving belt 106 and opposed belt 108, and into a channel 164, also described herein as a guide channel, defined by second guide chute 112 and driving belt 106. Second guide chute 112 is positioned at an angle relative to first guide chute 111 such that, when strip 121 is expelled from second guide chute 112 toward layup roller 114, strip 121 contacts a surface 166 of layup roller 114. Guide channel 164 is, therefore, configured to discharge strip 121 to surface 166 of layup roller 114. While layup roller 114 guides strip 121 into position on tool surface 117, actuator 116 forces layup roller 114 toward tool surface 117, compressing strips 121 onto tool surface 117 as layup roller 114 rotates in a direction 168. Layup roller 114 exerts a substantially constant pressure on strips 121, which enhances the ability of device 100 to adapt to the contours of tool surface 117. Layup roller 114, therefore, is configured to deposit strip 121 onto tool surface 117. The guided lay-down of strip 121 serves to control both the positioning of strip 121 onto tool surface 117 and the adhering of strip 121 to tool surface 117. This process reduces waste by strategically placing strips 121 onto useful portions of tool surface 117 and not onto non-useful portions of tool surface 117, such as regions to be removed by a lathe or mill or other machining equipment, which reduces the amount of excess material that is wasted. Once strip 121 has advanced to a position underneath layup roller 114, driving belt 106 is either passively idle to allow layup roller 114 to continue to advance strip 121 itself or driving belt 106 is actively controlled to reduce a potential shearing force on strip 121 when strip 121 contacts layup roller 114. In the exemplary embodiment, actuator 116 is a pneumatic actuator. In alternative embodiments, actuator 116 is any suitable actuator that enables device 100 to function as described herein.

In alternative embodiments, strips 121 are not assembled into cartridge 102, but instead are assembled in a stack (not shown), away from device 100. In further alternative embodiments, strips 121 are located away from device 100 on an accessible surface, such as, but not limited to, a tray (not shown) of a dispersed plurality of strips 121. Further, in alternative embodiments, one or more strips 121 are any suitable shape and include any suitable material that enables suction head 122 to function as described herein, including, but not limited to, parcels of materials that otherwise would not be characterized as strips. Suction arm 120 is actuated along axis 123 by actuators 118 and linear guide 124 to position suction head 122 over a strip 121 or a stack of strips 121. Suction head 122 then applies a suction or partial vacuum to at least one strip 121. Actuator 118 and suction head 122 are therefore configured to translate arm 120 to translate along vertical axis 123 defined normal tool surface 123. Linear guide 124 allows arm 120, and therefore suction head 122, to translate along axis 123, which avoids the movement of strip 121 along the orthogonal plane defined by axes 125 and 127. Linear guide 124, therefore, is configured to avoid translational motion of arm 120 along lateral axis 125 and longitudinal axis 127. Each strip 121 can then be picked up from the stack, also referred to herein as a first position, by suction head 122 and positioned over tool surface 117, also referred to herein as a second position. Suction head 122 is therefore configured to couple a plurality of strips 121 by first removing strips 121 from a first position away from tool surface 117, positioning strips 121 at a second position on tool surface 117, and releasing strips 121 at a second position on tool surface 117. Pressure can be applied to strip 121 once strip 121 is on tool surface 117 by translating actuator 118, and therefore suction arm 120, in a plane normal to tool surface 117 to compress strip 121 onto tool surface 117. In an alternative embodiment, once strip 121 is placed onto tool surface 117 by suction head 122, layup roller 114 is configured to compress strip 121 via actuating actuator 116 in a plane normal to tool surface 117 to compress strip 121 onto tool surface 117.

Figure 5:
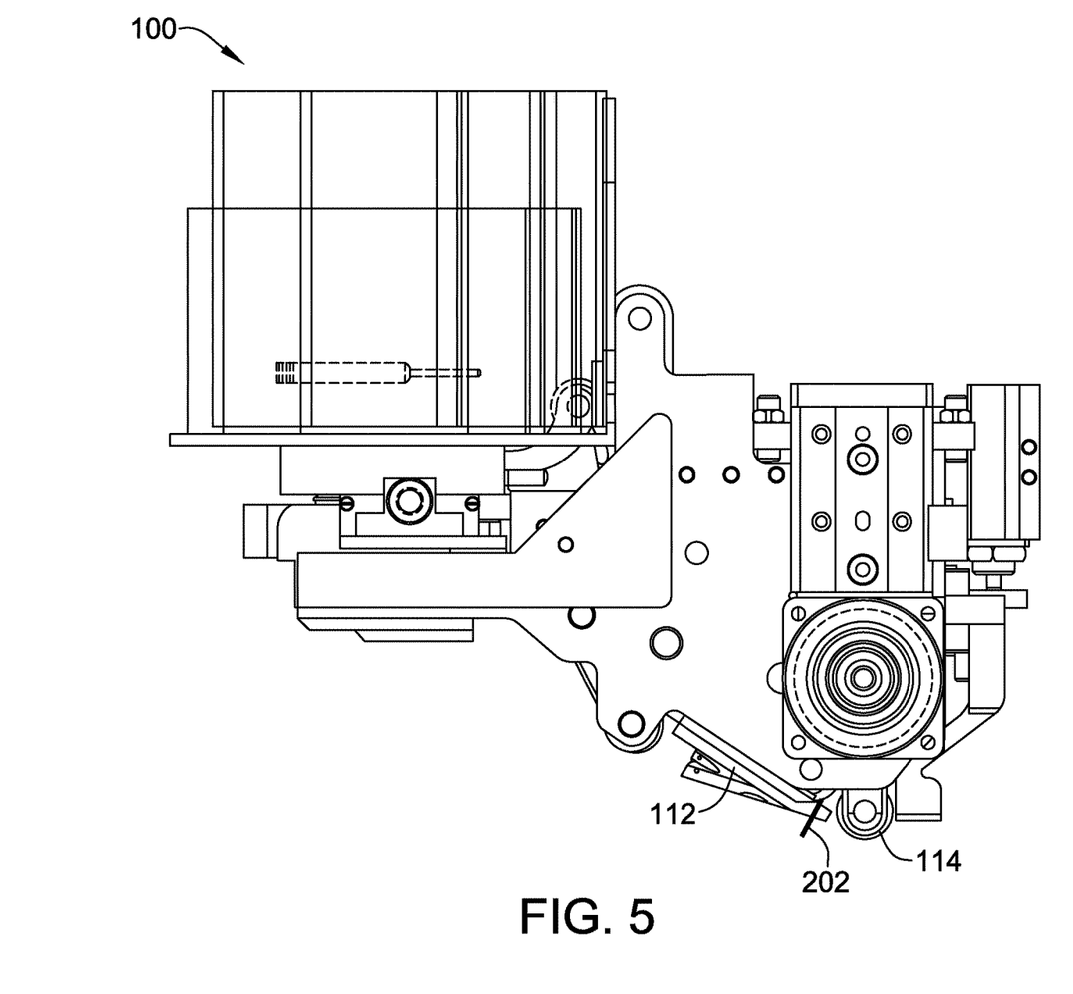
FIG. 5 is a perspective view of the automated material delivery device shown in FIG. 1 further including an in-situ cutter.

FIG. 5 is a perspective view of automated material delivery device 100 further including an in-situ cutter 202. In-situ cutter 202 is coupled to second guide chute 112 and is positioned such that a strip 121 passes through in-situ cutter 202 before reaching layup roller 114. Strips 121 are fed through device 100 as described above, and in-situ cutter 202 is configured to cut strips 121 into smaller strips 121 before strips 121 are rolled onto tool surface 117 (shown in FIG. 2) by layup roller 114. In the exemplary embodiment, in-situ cutter 202 cuts strips 121 into a substantially rectangular shape. In alternative embodiments, in-situ cuter 202 cuts strips 121 at any suitable angle such that the resulting strips 121 are trapezoidal and that enables the strips 121 to be placed on tool surface 117 by device 100 as described herein.

Figure 6:
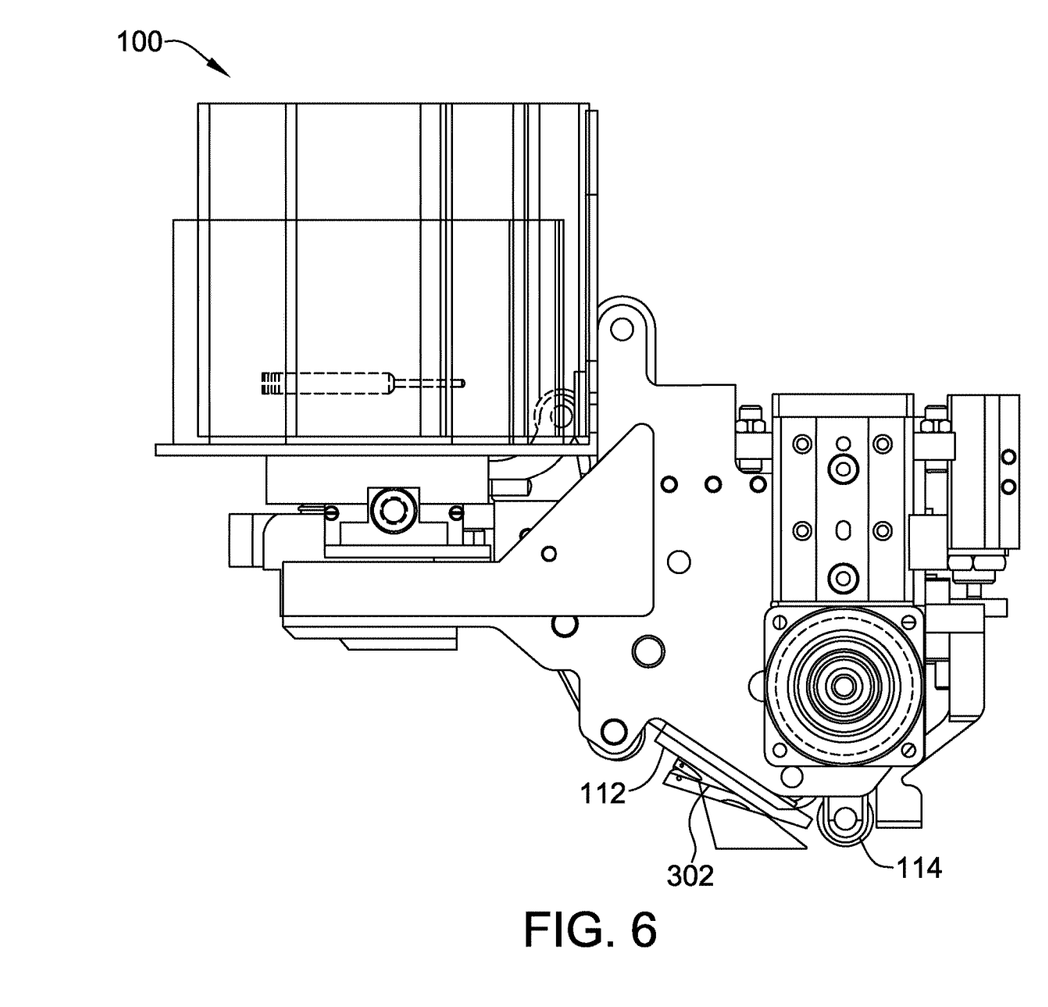
FIG. 6 is a perspective view of the automated material delivery device shown in FIG. 1 further including an optical heater.

FIG. 6 is a perspective view of automated material delivery device 100 further including heating device 302. Heating device 302 is coupled to second guide chute 112 and is configured to heat at least a portion of tool surface 117 (shown in FIG. 2) and/or a surface of strip 121 before strip 121 is disposed on tool surface 117. The heating of tool surface 117 before strips 121 are rolled onto tool surface 117 adheres strips 121 more effectively to tool surface 117. In alternative embodiments, the entire tool surface 117 is heated external to device 100 (not shown) before strips 121 are rolled onto tool surface 117. In the exemplary embodiment, heating device 302 is an infrared heater or infrared laser. In alternative embodiments, heating device 302 is any suitable heating device that enables device 100 to function as described herein.

Figure 7:
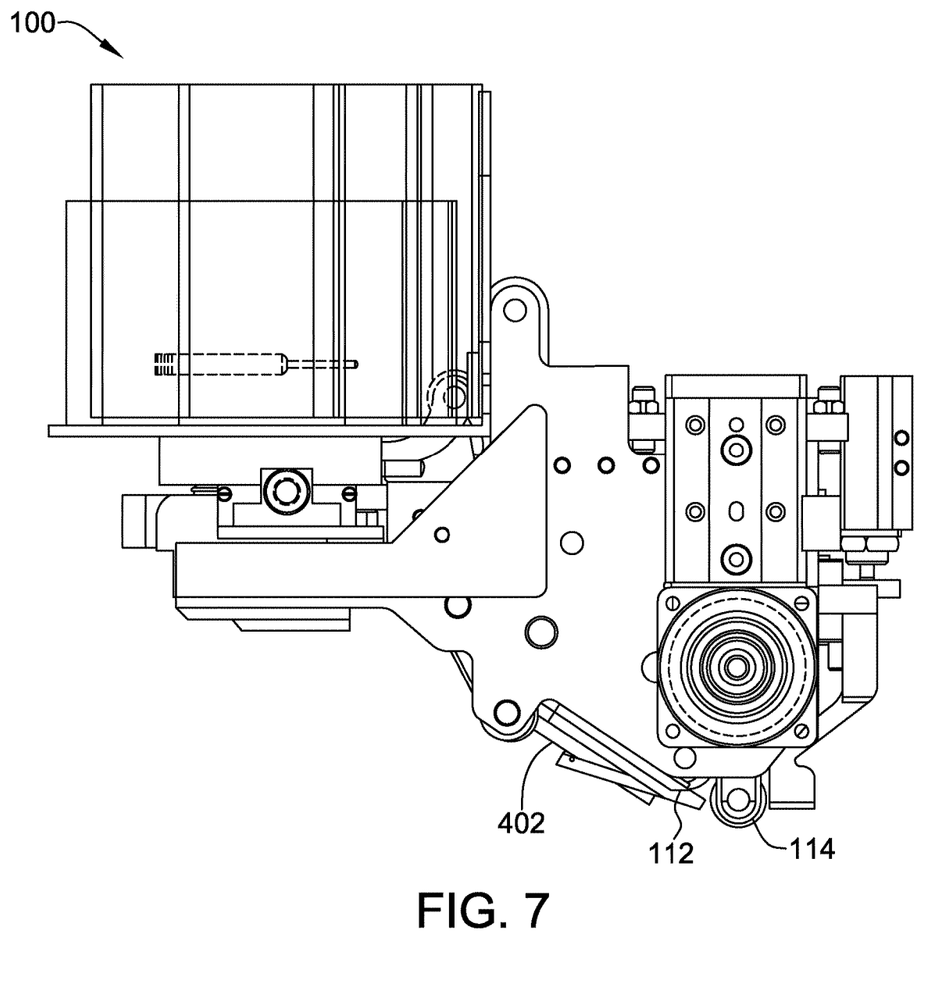
FIG. 7 is a perspective view of the automated material delivery device shown in FIG. 1 further including a liquid spray nozzle.

FIG. 7 is a perspective view of automated material delivery 100 further including spray nozzle 402. Spray nozzle 402 is coupled to second guide chute 112 and is configured to spray adhesion-promoting liquid from an external source (not shown) toward tool surface 117 to facilitate the adhesion of strips 121 to tool surface 117, which improves the bond between strips 121 and tool surface 117. In alternative embodiments, spray nozzle 402 includes a liquid pressure source that delivers adhesion-promoting liquid to spray nozzle 402 and an air pressure source that enables the liquid spray to form an aerosol that facilitates a substantially uniform distribution of adhesive onto tool surface 117. In these embodiments, the pressures of the air source and liquid source are controlled by a pressure regulator and are active only during the layup process, i.e., during adhesion of strips 121 to tool surface 117.

Figure 8:
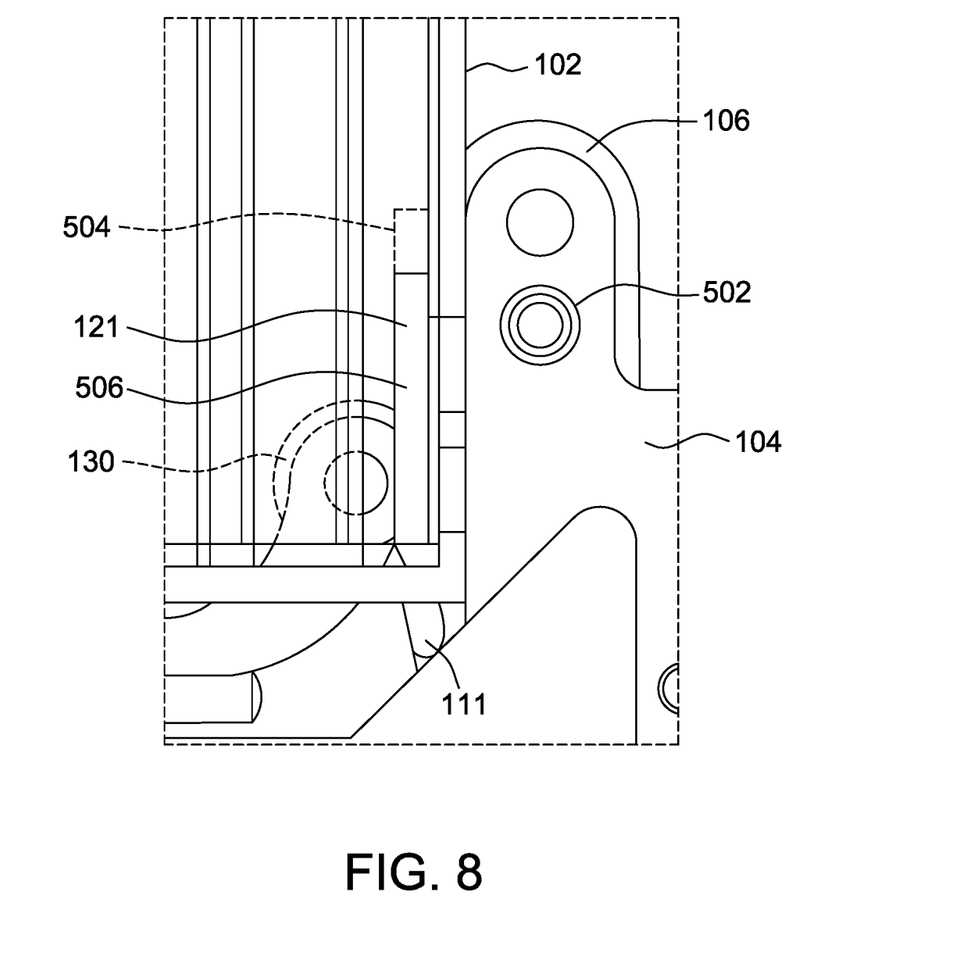
FIG. 8 is an enlarged perspective view of the automated material delivery device shown in FIG. 1 taken within area 8.

FIG. 8 is an enlarged perspective view of a portion of automated material delivery device 100 (shown in FIG. 1) taken within area 8. In the exemplary embodiment, a sensor 502 is coupled to housing 104. Sensor 502 is configured to detect a first strip position 504, shown in phantom, and a second strip position 506 of strip 121 as strip 121 is fed through device 100. Sensor 502 is further configured to detect a change in position of strip 121. In the illustrated embodiment, sensor 502 detects a first strip position 504 of strip 121 as strip 121 is engaged by nip roller 130, and a second strip position 506 of strip 121 as strip 121 is translated into channel 160 (shown in FIG. 4) by driving belt 106. In alternative embodiments, sensor 502 is coupled to any other portion of device 100 that enables sensor 502 to detect a position or change in position of strip 121. In other alternative embodiments, sensor 502 is coupled to housing 104 to detect a position or change of position of a strip 121 that is external to device 100, such as the position of a strip 121 in a stack of strips 121. In further alternative embodiments, sensor 502 is configured to detect the position of strip holder 129. In other alternative embodiments, sensor 502 is not coupled to device 100, but rather is coupled to an external surface (not shown) to detect position of a strip 121 relative to device 100, such as the position of a strip 121 relative to suction head 122. In the exemplary embodiment, sensor 502 is an optical sensor. In alternative embodiments, sensor 502 is a proximity sensor, or any other suitable sensor that enables device 100 to function as described herein.

The above described automated material delivery device overcomes several deficiencies associated with known devices. The device described herein facilitates the fabrication of a part for an apparatus separate from the automated material delivery device. The automated material delivery device facilitates the fabrication of the part by laying down thin strips of material on a tool surface. The tool surface includes, for example and without limitation, engine parts, blades, vanes, nozzles, shrouds, and liners. Laying down strips using the device and methods described herein facilitates a greater degree of control and flexibility in making the part. The parts, once manufactured, have a wide array of industrial applications, such as use in the aircraft industry to manufacture structural components. Thin strips are capable of adapting and contouring to complex geometries on a tool surface and reduce the possibility of developing wrinkles in the composite fibers of the strips. Further, thin strips improve material utilization by decreasing the amount of waste of raw composite materials. The device described herein facilitates the automation of laying strips on the tool surface, while also improving the quality of the part and the consistency of the surface of the part.

An exemplary technical effect of the methods, systems, and device herein includes at least one of: (a) adhering or positioning strips of composite materials onto a tool surface for materials that are undesirable to manufacture into spools; (b) reducing material waste by strategically positioning small strips of material rather than using a larger sheet of material and cutting away the excess; (c) reducing material waste by only placing the strips onto useful areas of the tool surface and not onto areas, for example, of the tool surface that will later be removed by a lathe or other machining equipment; (d) reducing manual labor involved in laying composite materials, leading to higher quality parts and greater accuracy in placing the strips; and (e) enhancing the ability to adapt to the contours of the tool surface by using a roller with constant pressure on the strips.

Exemplary embodiments of an automated material delivery device are described above in detail. The automated material delivery device and methods of manufacturing or operating such a system and device are not limited to the specific embodiments described herein, but rather, components of systems and/or steps of the methods may be utilized independently and separately from other components and/or steps described herein. For example, the systems, apparatus, and methods may also be used in combination with other types of materials, and are not limited to practice with only the composite materials described herein. Rather, the exemplary embodiment can be implemented and utilized in connection with many other applications, equipment, and systems that may benefit from using an automated material delivery device.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for placement of a material on a surface, said device comprising:
   a housing;
   a motor coupled to said housing;
   a driving component coupled to said housing and powered by said motor;
   at least one guide chute, wherein a first guide chute of the at least one guide chute is arranged extending downward along a vertical axis from a cartridge, the first guide chute and said driving component defining a guide channel;
   a layup roller coupled to said housing adjacent said guide channel, said layup roller comprising a roller surface, wherein said guide channel is configured to discharge a quantity of the material to the roller surface, said layup roller configured to deposit the material onto said surface; and
   the cartridge coupled to said housing, said cartridge configured to discharge the material to said guide channel, the material including a plurality of strips, wherein said cartridge comprises a strip holder configured to hold the material, said strip holder further configured to discharge one strip of the plurality of strips at a time toward said guide channel.

2. The device in accordance with claim 1, further comprising a cutter coupled to said at least one guide chute.

3. The device in accordance with claim 1, further comprising a heating device coupled to said at least one guide chute, said heating device configured to heat said surface.

4. The device in accordance with claim 1, further comprising a spray nozzle coupled to said at least one guide chute, said spray nozzle configured to spray an adhesion-promoting liquid toward said surface.

5. The device in accordance with claim 1, further comprising an actuator coupled to said layup roller, said actuator configured to translate said layup roller along a plane normal to said surface, said actuator further configured to compress the material between said layup roller and said surface.

6. The device in accordance with claim 1, further comprising a passive component opposing said driving component, said passive component and said driving component defining a component channel.

7. The device in accordance with claim 6, wherein said passive component is powered by said motor.

8. The device in accordance with claim 6, wherein said at least one guide chute comprises the first guide chute and a second guide chute, said first guide chute and said driving component defining a first guide channel, said second guide chute and said driving component defining a second guide channel, wherein said first guide channel, said component channel, and said second guide channel are configured in series to discharge the material to the roller surface.

9. The device in accordance with claim 1, further comprising a sensor coupled to said housing, said sensor configured to detect a change in position of the material.

10. The device in accordance with claim 1, further comprising:
    an actuator coupled to said housing;
    a suction arm coupled to said actuator;
    a linear guide coupled to said housing and said suction arm; and
    a suction head coupled to said suction arm, wherein said actuator is configured to translate said suction arm along the vertical axis defined normal to said surface, said linear guide is configured to avoid translational motion of said suction arm along a lateral axis and a longitudinal axis, the lateral axis and the longitudinal axis defined orthogonal to each other and to the vertical axis, and said suction head configured to couple to the material and remove the material from a first position away from said surface and place the material at a second position on said surface.

11. The device in accordance with claim 10, wherein said suction head is configured to release the material in the second position.

12. The device in accordance with claim 10, wherein said layup roller is configured to compress the material to said surface in the second position.

13. The device in accordance with claim 10, further comprising a sensor coupled to said housing, said sensor configured to detect a change in position of the material.

14. The device in accordance with claim 1, wherein the strip holder is coupled to the cartridge.

15. The device in accordance with claim 1, wherein the strip holder is configured to rotate inside the cartridge.

16. The device in accordance with claim 1, wherein the strip holder is configured to hold the plurality of strips circumferentially around an outer surface of the strip holder.

17. The device in accordance with claim 1, wherein the strip holder is configured to hold the plurality of strips within a volume of the strip holder.

18. A method of adhering a material to a surface using a device, the device including a motor, a drive belt powered by the motor, a passive belt opposing the drive belt, the passive belt and the drive belt defining a belt channel, at least one guide chute, a first guide chute of the at least one guide chute arranged extending downward along a vertical axis from a cartridge, the first guide chute and drive belt defining a guide channel, and a layup roller adjacent the guide channel, said method comprising:
    positioning the material into the guide channel;
    driving the drive belt such that the material moves from the belt channel to the guide channel to a position adjacent to the layup roller; and
    translating the device along a plane parallel to said surface such that the material is adhered to said surface;
    discharging the material from the cartridge to one of the belt channel and the guide channel; and
    wherein the cartridge includes a strip holder configured to hold the material, the material including a plurality of strips, said method further comprising discharging at least one strip of the plurality of strips from the strip holder to one of the belt channel and the guide channel.

19. The method in accordance with claim 18, wherein the device further includes a cutter coupled to the at least one guide chute, said method further comprising cutting the material with the cutter.

20. The method in accordance with claim 18, wherein the device further includes an actuator coupled to the layup roller, said method further comprising compressing the material between the layup roller and said surface.

* * * * *